United States Patent
Claiborne

(10) Patent No.: US 7,051,320 B2
(45) Date of Patent: May 23, 2006

(54) DIAGNOSTIC TOOL FOR A PLURALITY OF NETWORKED COMPUTERS WITH INCIDENT ESCALATOR AND RELOCATION OF INFORMATION TO ANOTHER COMPUTER

(75) Inventor: Andrew E. Claiborne, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 673 days.

(21) Appl. No.: 10/226,515

(22) Filed: Aug. 22, 2002

(65) Prior Publication Data
US 2004/0039799 A1 Feb. 26, 2004

(51) Int. Cl.
*G06F 9/44* (2006.01)

(52) U.S. Cl. ..................... 717/127; 709/224

(58) Field of Classification Search ............... 717/101, 717/127; 709/224; 714/38
See application file for complete search history.

(56) References Cited

U.S. PATENT DOCUMENTS

| | | | |
|---|---|---|---|
| 5,528,759 A | 6/1996 | Moore | |
| 5,828,830 A | 10/1998 | Rangaraian et al. | |
| 5,860,073 A * | 1/1999 | Ferrel et al. | 715/522 |
| 5,978,787 A | 11/1999 | Wong et al. | |
| 5,999,604 A | 12/1999 | Walter | |
| 6,011,844 A * | 1/2000 | Uppaluru et al. | 379/220.01 |
| 6,012,152 A | 1/2000 | Douik et al. | |
| 6,148,335 A | 11/2000 | Haggard et al. | |
| 6,199,058 B1 | 3/2001 | Wong et al. | |
| 6,266,788 B1 | 7/2001 | Othmer et al. | |
| 6,324,276 B1 * | 11/2001 | Uppaluru et al. | 379/220.01 |
| 6,360,246 B1 | 3/2002 | Begley et al. | |
| 6,377,955 B1 | 4/2002 | Hartmann et al. | |
| 6,381,329 B1 * | 4/2002 | Uppaluru et al. | 379/266.04 |
| 6,445,784 B1 * | 9/2002 | Uppaluru et al. | 379/220.01 |
| 6,446,200 B1 | 9/2002 | Ball et al. | |
| 6,490,620 B1 | 12/2002 | Ditmer et al. | |
| 6,605,120 B1 | 8/2003 | Fields et al. | |
| 6,662,235 B1 | 12/2003 | Callis et al. | |
| 6,678,250 B1 | 1/2004 | Grabelsky et al. | |
| 6,683,947 B1 * | 1/2004 | Roelle et al. | 379/265.03 |
| 6,701,514 B1 * | 3/2004 | Haswell et al. | 717/115 |
| 6,771,742 B1 * | 8/2004 | McCalmont et al. | 379/45 |
| 6,778,638 B1 | 8/2004 | Jean et al. | |
| 6,907,546 B1 * | 6/2005 | Haswell et al. | 714/38 |
| 6,914,975 B1 * | 7/2005 | Koehler et al. | 379/265.05 |
| 2003/0126307 A1 | 7/2003 | Linder et al. | |

OTHER PUBLICATIONS

"Problem Trackin Task Reference", Continuous Software Corporation, pp. 1-209, 1996.*
"Cascading HTML Style Sheets—a proposal" W3C.org Oct. 10, 1994, 6 pages.*
Focus on OpenView, Nathan J. Muller, 1995, Whole Manual.*
Application Manager using Radia, 2 pages No Date, http://www.softwaretest.force9.co.uk/tool11926.htm.*
Computer Associates Enterprise-wide Automation, Tim Bruner Feb. 27, 2001, 43 slides.*

(Continued)

*Primary Examiner*—Todd Ingberg

(57) ABSTRACT

In an enterprise having multiple computers with differing systems, atribute information including contact information and host information is first installed on the computers in a system independent manner. Then this information is adjusted in accordance with the perticular system on each computer.

15 Claims, 3 Drawing Sheets

OTHER PUBLICATIONS

CentreWare for Unicenter TNG, User's Guide, version 1.0.8, 2000, whole manual.*
Unicenter Service Desk, Getting Started, Computer Associates, 2001, Whole Manual.*
Proceedings of the 14th Systems Administration Conference, New Orleans, Louisiana, Dec. 3-8, 2000, pp. 131-137.*
Advanced Help Desk Implementation, Tushar Bhansail et al, No Date, 11 pages, http://doc.advisor.com/doc/05365.*

* cited by examiner

DIAGNOSTIC TOOL FOR A PLURALITY OF NETWORKED COMPUTERS WITH INCIDENT ESCALATOR AND RELOCATION OF INFORMATION TO ANOTHER COMPUTER

BACKGROUND OF THE INVENTION

1. Field of the Invention

The present invention relates to simplifying the process of customizing the configurations of many different types of computers to simplify their maintenance and repair. In particular, it relates to automatically transforming uniform configuration data into different forms to compensate for different computer configurations.

2. Description of the Related Art

As the number of personal computers and servers used throughout business enterprises has increased, and as the price of the hardware and software has decreased, the cost of setting up and maintaining a large array of networked computers has come to be dominated by cost of servicing the computers and keeping them all operating. In the past, this was done by manual intervention, with service personnel visiting each computer or with the computers being brought in for repair. But the cost of providing such manual service is high, and the difficulties of providing trained staff members able to cope with any problem that might arise on any given computer has also grown. Additionally, the time it takes for service personnel to visit a site greatly increases the time during which a given computer may be out of service due to some problem.

Accordingly, attempts have been made in the past to automate some or all of the tasks relating to computer maintenance and repair. With respect to personal computers, a first approach has been to make available to the user, on the computer itself and also within service sites maintained on the Internet, knowledge data bases containing detailed documentary descriptions of the programs, and also self-help tools. Thus, for example, one may learn from a centralized database that new software drivers for hardware accessories are available, and these may be downloaded and automatically installed on personal computers. Likewise, software patch analyzers are available which can trace a problem to software defects and which can suggest the downloading of more recent versions of the software that may cure those problems.

An even more sophisticated approach to PC maintenance is provided by the ServiceNet platform developed by Motive Communications, Incorporated. ServiceNet is designed around a self-help paradigm in which a person using a desktop computer notices a problem and then manually opens a "trouble ticket" that is transmitted to a support provider. The PC operator uses a web interface to report the problem to a program called Chorus Client, which is an incident escalator. The incident escalator first may try to run prewritten diagnostic scripts or provide "self-help" tools. It may then "isolate" the incident, running scripts to gather configuration data, and then combining the user's problem description and the configuration data with contact information identifying the user of the computer and including such things as name, e-mail address, and telephone number. It may also gather host information from the PC. These are transmitted to an incident receiver which parses the information and passes it on to a central analysis server where a program called Duet, in combination with a program called Insight, enable the provision of "online" assistance by a service engineer to review the problem in the context of the user's computer as configured and to provide assistance.

The configuration data must be installed on every computer in an enterprise that is subject to this type of maintenance and support. It identifies, among other possible things, the name and e-mail address, etc., of the one who is to be contacted when a computer needs support. It can also identify the name, etc. of a system as well as critical network parameters, such as proxy hosts.

One difficulty is that computers differ. They may be running differing operating systems, for example. Such differences necessitate configuration data to be represented differently or to be stored in different files.

SUMMARY OF THE INVENTION

Briefly summarized, an embodiment of the present invention is an apparatus that installs and adjusts the attributes of computers having differing types of systems. It comprises an installer that installs a set of attributes on a computer, the attributes organized in a system independent manner; and a configuration adjuster that adjusts the set of attributes in a system dependent manner in accordance with the particular system on the computer.

Another embodiment is a method for setting the attributes of a computer in an enterprise having multiple types of computers. The method comprises installing attribute information on each of several different types of computers, formatting and organizing this information in a way that is essentially the same on all of the different types of computers. It further comprises checking the type of each computer; and reformatting, reorganizing, or relocating the attribute information on each computer in accordance with the requirements of each different type of computer.

DETAILED DESCRIPTION

An embodiment of the present invention is primarily built on top of, and is designed to enhance and augment, a product called the ServiceNet Platform developed by Motive Communications, Incorporated.

Figure 1:
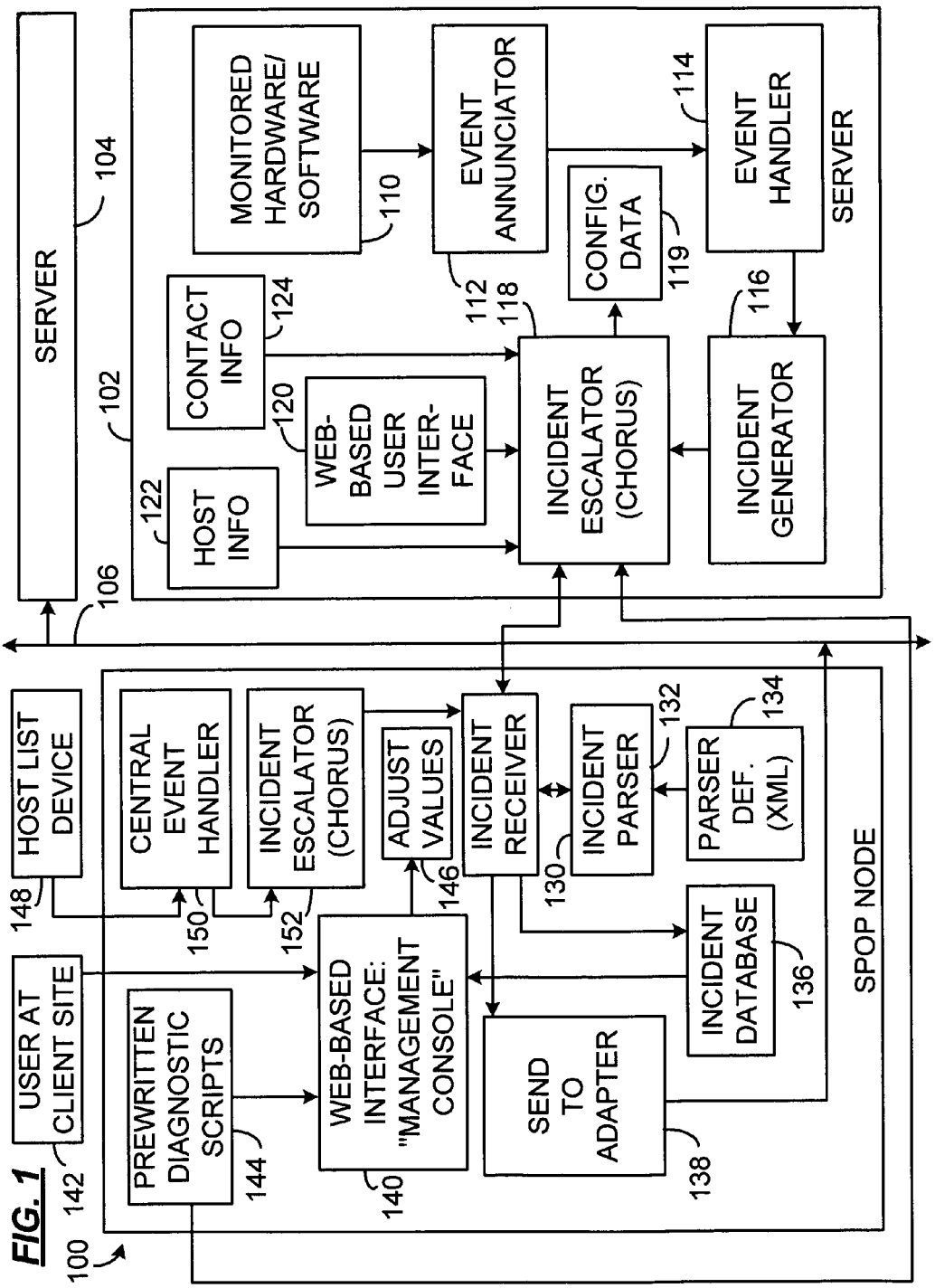
FIG. 1 is a block diagram illustrating an embodiment of the invention that utilizes an SPOP node to monitor incidents originating from a number of servers at a remote site.

With reference to FIG. 1, a server 102 is shown. Assuming for the moment, for the purpose of briefly describing ServiceNet, that this is a personal computer (rather than a server), the ServiceNet system works conventionally (in its unmodified state) in the following manner. When the user of this personal computer detects a problem, the user clicks on a "service" icon (on the user's desktop or within an application, for example) that causes a web browser to bring up a web-based user interface 120 which provides the user with a form into which the user may enter a description of the problem. This information is then passed to a program called Motive Chorus, a client program that resides upon the personal computer and that serves as an interactive assistance tool, capable of running diagnostic scripts, and also functioning as an incident escalator 118. In addition, the personal computer contains host information 122 and also contact information 124 defining the name, phone number, e-mail address of the operator or manager of this particular computer to make it possible for service personnel to contact that individual or individuals. The escalator 118 may also run scripts 144 to gather configuration data. The incident escalator 118 combines this configuration data, host information, and contact information with the user-supplier information defining the incident; and then all of this information is passed on to an incident receiver 130 which records the incident in a database 136. Then programs called Motive Insight and Motive Duet enable a service engineer to study the problem and to come up with possible solutions. A management console program 140 permits management of the server configuration information.

The embodiment of the present invention shown in FIG. 1 utilizes all of these elements of the ServiceNet Platform, but augments them to provide additional and expanded services that enhance the types of support that may be provided. In particular, proactive, or anticipatory data gathering actions and reactive, or event-triggered data gathering activities, are added to ServiceNet's user-reactive ability to log and to track events in a uniform manner, over many different hardware and software entities.

Referring now to FIG. 1, two typical, unattended servers 102 and 104 are shown and are presumed to be in an enterprise environment, interconnected by a network 106 to other enterprise devices. As can be seen, these servers are each equipped with an incident escalator 118, a web-based user interface 120, host information 122, and contact information 124. But since these servers typically run unattended, it is not normally possible to manually institute the creation of an incident record using the web-based user interface 120, as with a personal computer having a human operator. Instead, automatic event detectors are relied upon to detect significant events.

The server 102 contains both hardware and software that is monitored at 110. Associated with the monitored hardware and software 110 are one or more event annunciators 112. These event annunciators 112 may take widely differing forms depending upon the nature of the hardware or software that is monitored. Thus, for example, in the case of a disk drive, the event annunciators may check records maintained by a disk drive of how frequently the drive is encountering certain types of errors, and may compare those records to limit values for error counts.

When the event annunciator 112 discovers an event, it generates an announcement of the event, typically as an SNMP or TCP/IP message, that is routed to an event handler 114.

The event handler 114 is also customized to the monitored hardware or software 110, and follows up by investigating the event to see whether the event is one that may be ignored, whether it simply needs to be logged but does not require an immediate response, or whether the event should be reported as an incident that may need to be brought to the attention of service personnel. Both the event annunciator 112 and the event handler 114 are custom designed to match the server 102's hardware and operating system.

The first server 102 is equipped with the HP-UX operating system of Hewlett Packard. It also contains an event annunciator 112 called EMS (Hewlett Packard's EMS HA Monitor). The HP-UX event handler 114 is customized in accordance with the particularities of the HP-UX operating system running the server 102.

A second server 104 might be equipped with, for example, the Windows 2000 operating system, or with the Linux operating system. If it is a Hewlett Packard computer, it can utilize the Hewlett Packard program TopTools (not shown) as an event annunciator.

The incident escalator 118 on each server feed their incident messages into an SPOP (Support Point Of Presence) node (or server) 108 where the incident messages are preprocessed and then stored before being transmitted to a support vendor response center.

The SPOP node 108 contains an incident receiver 130, another software program provided by Motive Communications. The incident information coming in from the servers and, possibly, other devices must be parsed, and this is carried out by an incident parser 132. The particular messages within the incident reports are in accord with a program language design specification that is stored in and defined by an XML file called a parser definition 134. When the incident parser 132 starts up, it reads in the XML parser definition 134, and this configures the parser 132 to parse the particular types of messages which the incident escalators 118 are generating.

The parsed messages, including incident information, contact information, and host information, are stored in an incident database 136. This enables the user at the client site 142, by means of a web-based interface called a management console 140, also provided by Motive Communications 1 to view and to modify the configuration data of the servers. The user 142 may also use a program called Motive Insight, utilizing prewritten diagnostic scripts 144, to browse though and to organize incident information.

The web-based interface called management console 140 allows a user to adjust values 146, such as values defining the names, telephone numbers, and e-mail addresses of the multiple administrators and what servers they are to be the contact persons for in case of trouble, and other such things. The management console 140 is used to place the proper contact information into the files that the incident escalator 118 uses to populate incidents. The contact information 124 is contained in a flat file that may be defined and installed upon a computer at the time the computer is first set up with its software, and that can be easily modified later on.

The present invention addresses the problem that the incident escalator 118's host and contact information 122 and 124 may be formatted and stored differently on servers having differing operating systems.

The present invention, in one embodiment, provides this configuration data 119 presented in a uniform format, as indicated in Appendix A, on all servers regardless of operating system. Then, when the Motive Chorus incident escalator 118 is installed, a program (FIG. 3 and Appendix B) is run to reconfigure, rearrange, and relocate this uniform configuration 119 as needed to comply with the particular needs and idiosyncrasies of particular computers and operating systems. Thus, the designer of a software "install" system need not concern him- or herself with these details.

Figure 2:
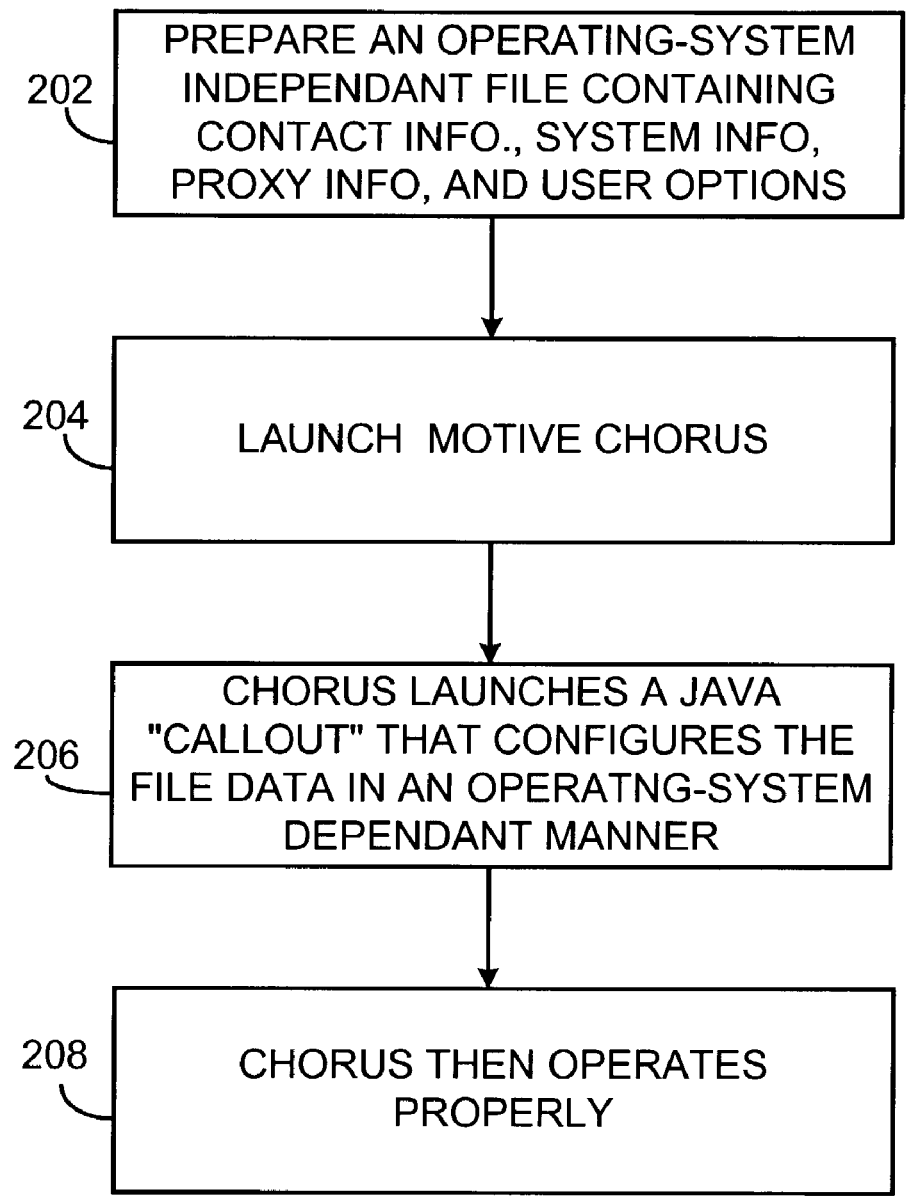
FIG. 2 is a block diagram illustrating one set of steps that can configure diverse computers using data obtained from an operating-system independent file.

In FIG. 2, the installation steps are described. First, at step 202, the operating system independent configuration data is prepared to include, for example, contact information (whom to contact in case the server malfunctions), system information (name, address, etc.), proxy host information, and the like.

Secondly, at step 204, the Motive Charm incident escalator automatically runs a "method" called "doCallout" in a Java program "StartCallout" on startup, if that method exists. Thus, at step 206, the Java program "CALLOUT," described in FIG. 3 and in Appendix B, is run. This program generates, among other things, the host and contact information files 122 and 124 or their equivalent properly formatted and configured for the particular operating system and computer.

Figure 3:
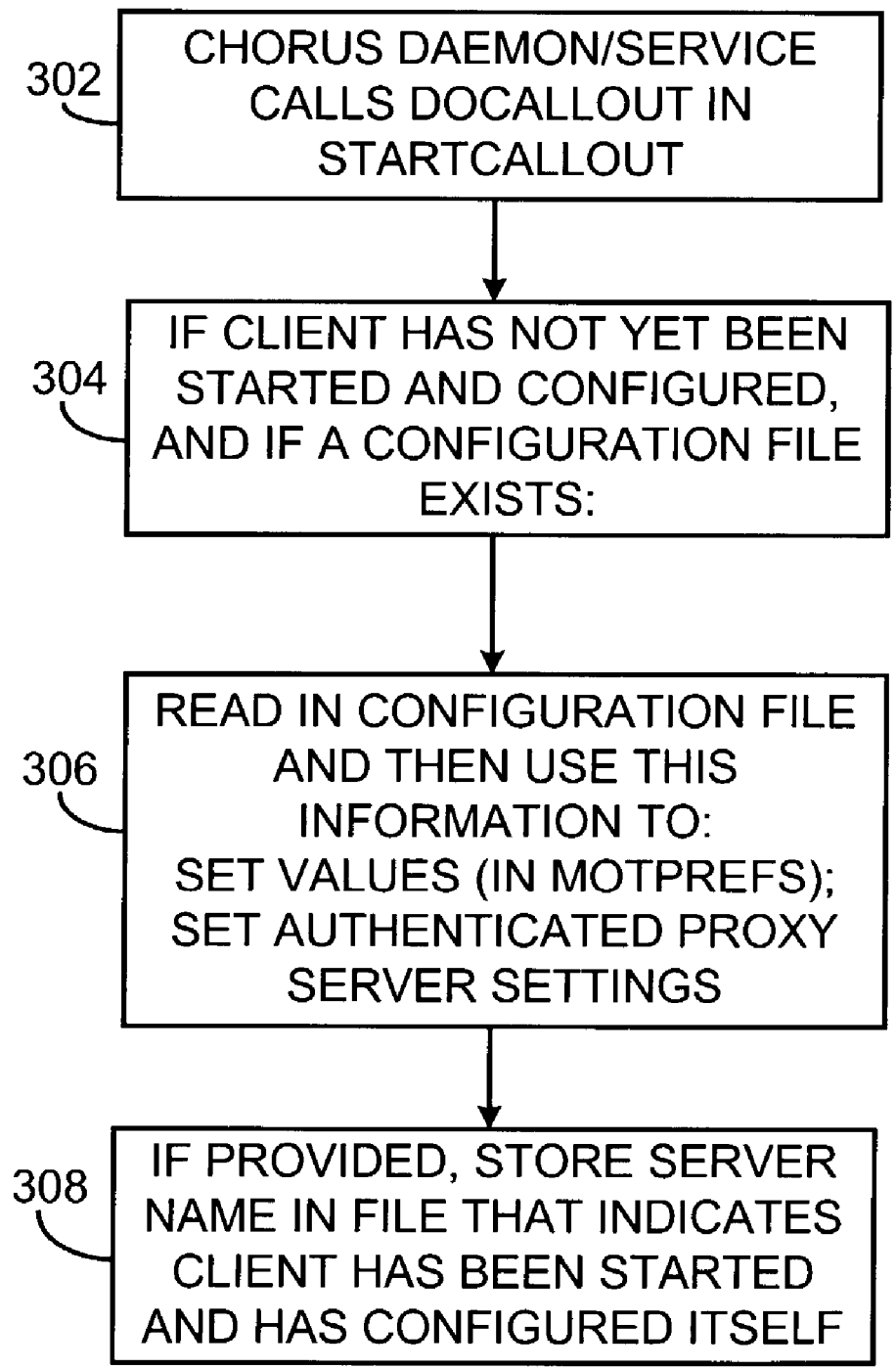
FIG. 3 illustrates in broad overview the program steps that are carried out to implement the present invention, in one embodiment.

The CALLOUT program is shown in broad overview in FIG. 3, and its details appear in Appendix B. The program is placed into execution at step 302, and was explained above. At step 304, the program terminates if the configuration file does not exist or if the Chorus "client" incident escalator 118 has already been started and configured. Otherwise, program control continues at step 306 where the uniform file 119 is read in and is used to govern the configuration of the contact and host information data and files 122 and 124, etc. And at step 308, the server name may also be stored in a file, and this may be taken as an indication the Chorus client has been started and configured.

Appendix A—Uniform Client Setup File

Overview:

This document describes the mechanism we use to configure the Windows Chorus Client when it is installed.

We will do the configuration by laying down an additional configuration file with the client. This file may be laid down by the installation process. When the client is first started, the client will call method in a "startup callout". This method will read the additional configuration file and use its values to set up the client.

If the additional configuration file does not include information about the Motive server and does specify the user's country, we assume we are in the SEC configuration. The "startup callout" therefore sets the Motive server to the content server at HP that is appropriate for the user's country.

If the configuration file is not laid down prior to the client starting, or it does not include information about the Motive server or the user's country, we do not attempt to set the user's Motive server in our "startup callout". We instead let the client software prompt the user for the country. When the user submits this information, the client software calls a method in a "preSync callout". This method sets the Motive server to the content server at HP that is appropriate for the user's country.

Configuration File Details:

On Windows machines, the additional configuration file that gets laid down with the client must be named %MotiveRoot%\..\RemoteSupport\config\setupInfo On UNIX and Linux machines, the configuration file must be named $MOTIVEROOT/RemoteSupport/config/setupInfo Note: If a setupinfo file is laid down, it is deleted as soon as the configuration has completed because it may contain the proxy server's password in plain text.

Setupinfo must conform to the standards of a Java Properties file. Each key, except "Server" and proxyPass, is in the format "MotprefsHeading/MotprefsKey". So, for example, if you wanted to set "EmailAddress" in the following motprefs file:

[GlobalSettings]
key1=value
key2=value
. . .

[ContactInfo]
EmailAddress=email@domain
. . .

You would add the following line to setupInfo ContactInfo/EmailAddress=newemail@newdomain When a client is automatically configured, we should have the following keys in setupinfo. Note that the keys are case sensitive.

| Key | Description | Value |
|---|---|---|
| Server | The name of the Motive Server | Any Plain Text |
| proxyPass | The password of the proxy server, or "" if the proxy server is not authenticated. | Any Plain Text |
| ContactInfo/firstName | Contact's First Name | Any Plain Text |
| ContactInfo/MiddleInitial | Contact's Middle Initial | Any Plain Text |
| ContactInfo/lastName | Contact's Last Name | Any Plain Text |
| ContactInfo/EmailAddress | Contact's Email Address | value@value |
| ContactInfo/JobTitle | Contact's Job Title | Any Plain Text |
| ContactInfo__HP__Services/HoursAvailability | Contact's hours of availability | Any Plain Text |
| ContactInfo/companyName | Company's Name | Any Plain Text |
| ContactInfo__HP__Services/Street | Company's Street Address | Any Plain Text |
| ContactInfo__HP__Services/Street2 | Company's Street Address 2 | Any Plain Text |
| ContactInfo/City | Company's City | Any Plain Text |
| ContactInfo/State | Company's State or Province | Any Plain Text |
| ContactInfo__HP__Services/PostalCode | Company's Postal Code | Any Plain Text |

-continued

| Key | Description | Value |
|---|---|---|
| ContactInfo/country | Company's 2-Letter Country Code | 2 capital letters |
| ContactInfo/officePhone | Office Phone Number | Any Plain Text |
| ContactInfo_HP_Services/Fax | Fax Number | Any Plain Text |
| ContactInfo_HP_Services/SystemHandle | System Handle | Any Plain Text |
| ContactInfo_HP_Services/systemLocation | System's Location | Any Plain Text |
| GlobalSettings/NOTIFY_ALERT_MAIL_ASSIGNED | Should ISEE email you when an incident is assigned? | "y" or "n" |
| GlobalSettings/NOTIFY_ALERT_MAIL_MAP_REQUEST | Should ISEE email you when an Support Analyst wants to run a diagnostic or repair routine on this system? | "y" or "n" |
| GlobalSettings/NOTIFY_ALERT_MAIL_CLOSE | Should ISEE email you when a Support Analyst closes an incident? | "y" or "n" |
| GlobalSettings/AUTO_RUN | Do you want to allow HP Support Analysts to run a diagnostic or repair routine on this system without your prior approval? | "y" or "n" |
| Security/GLOBAL_NET | Do you want to give diagnostic and repair routines access to networked computers or peripherals? | "y" or "n" |
| Security/GLOBAL_READ | Do you want to give diagnostic and repair routines "read" access to your file system? | "y" or "n" |
| Security/GLOBAL_WRITE | Do you want to give diagnostic and repair routines "write" access to your file system? | "y" or "n" |
| Security/GLOBAL_DELETE | Do you want to allow diagnostic and repair routines to delete files from your system? | "y" or "n" |
| Security/GLOBAL_EXEC | Do you want to allow diagnostic and repair routines to execute programs on your system? | "y" or "n" |
| GlobalSettings/PROXY | Proxy Server Name and Port(NAME:PORT) | Any plain text |
| GlobalSettings/PROXY_USER | Proxy Server's Login or "" if it is not authenticated | Any plain text |

Example setupInfo file

Below is an example of how a setupInfo file should look:

```
Server = fully.qualified.spop.name
proxyPass = proxyPasswdInPlainTextIfUsingAuthenticated Proxy
ContactInfo/firstName = John
ContactInfo/MiddleInitial = Q
ContactInfolastName = User
ContactInfo/EmailAddress = johnq@boringCompany.com
ContactInfo/JobTitle = Mindless drone
ContactInfo_HP_Services/HoursAvailability = All the damn time
ContactInfo/companyName = Evil Cog Factory
ContactInfo_HP Services/Street = 666 Evil Cog Drive
ContactInfo_HP_Services/Street2 = Suite 913
ContactInfo/City = Istanbul
ContactInfo/State = WY
ContactInfo_HP_Services/PostalCode = 80555
ContactInfo/country = GB
ContactInfo/officePhone = days 1234 nights 1234
ContactInfo_HP_Services/Fax = 4321-000
ContactInfo_HP_Services/SystemHandle = whateverTheSystemHandleIs
ContactInfo_HP Services/system Location = glass room
GlobalSettings/NOTIFY_ALERT_MAIL_ASSIGNED = n
GlobalSettings/NOTIFY_ALERT_MAIL_MAP_REQUEST = n
GlobalSettings/NOTIFY_ALERT_MAIL_CLOSE = n
GlobalSettings/AUTO_RUN = y
Security/GLOBAL_NET = y
Security/GLOBAL_READ = y
Security/GLOBAL_WRITE = y
Security/GLOBAL_DELETE = y
Security/GLOBAL_EXEC = y
```

-continued

```
GlobalSettings/PROXY = web-proxy.evilcogs.com:5243
GlobalSettings/PROXY_USER = proxyUserInPlainText
```

Appendix B

Program Listing

In the program that follows, the following external routines perform the indicated tasks:

Motive Prefs

Adds, removes, deletes values in configuration files (program supplied by Motive).

StringGet and Get

Give key, get back value (program supplied by Motive

Remove

Takes a key and removes a key value pair from configuration file (program provided by Motive).

Debug

Prints a debugging statement.

GetConstant

Fetches a constant from the uniform configuration file.

GetRemoteSupportConfigDir

Returns a directory location.

```java
public class StartCallout extends ScriptCallout
{
/**
 * This class attempts to configure the client at startup.
 * (c) Hewlett-Packard 2001
 * @(#)$Header: /src/Client/Common/callout/StartCallout.java 32 2002/08/08 15:22:48 -0600 claiborne $
 **/
public int doCallout( ) throws Exception
{
    debug("In StartCallout:doCallout( )");
    try
    {
      setUpClient( );
    }
    catch ( Exception e )
    {
      System.err.println("Unable to set up the client:" +
      e.getMessage( ));
      return CALL_No;
    }
    return CALL_ACTION|CALL_RELOAD|CALL_NO;
}
private void setUpClient( ) throws Exception
{
    debug("In StartCallout:setUpClient( )");
// Have we already been set up? If so, return.
java.io.File beenSetup = new java.io.File(getRemoteSupportConfigDir( ) +
                java.io.File.separator +
                getConstant("CLIENTCONFIGURED"));
if ( beenSetup.exists( ) ) // we've been set up already
{
        debug(" Client has already been set up");
        return;
}
// if setup file exists, Set up our info
String setupFileName = getRemoteSupportConfigDir( ) +
                java.io.File.separator +
                getConstant("SETUPFILE");
java.io.File setupFile = new java.io.File(setupFileName);
String server="unknown";
if ( setupFile.exists( ))
```

-continued

```
{
        debug(" Parsing setup file");
  java.io.FileInputStream configStream = new java.io.FileInputStream(setupFileName);
              setupFileName);
  java.util.Properties setupProps = new java.util.Properties( );
  try
  {
    setupProps.load(configStream);
  }
  catch(java.io.IOException e)
  {
    System.err.println("Unable to load configuration properties:" + e.getMessage( ));
    return;
  }
  // Setup motprefs . . .
  java.util.Enumeration keys = setupProps.propertyNames( );
  String key;
  String value;
  MotivePrefs motprefs = new MotivePrefs(motRoot + java.io.File.separator + "etc" +
java.io.File.separator + "motprefs");
  String proxyUser="";
  String proxyName="";
  String proxyPass="";
  while(keys.hasMoreElements( ))
  {
    key=(String)keys.nextElement( );
    value=setupProps.getProperty(key);
        debug(  "Handling " + key + " from " + setupFileName);
    // The server is a special case . . . we have to keep track if it's been specified so
    // we will know if we need to do the SEC server selection in the preSync script.
    // If it is specified we also need to set several keys in motprefs.
    if (key.equalsIgnoreCase("Server"))
    {
    server=value;
    motprefs.set("ContactInfo_HP_Services/server", value);
    motprefs.set("GlobalSettings/DEFAULT_MOTIVE_SERVER", value);
  }
      //Do not store plain test proxy password in motprefs
      // Instead keep track of it so we can set it later.
      else if (key.equalsIgnoreCase("proxyPass"))
      {
        debug("  Doing special handling of proxyPass");
    proxyPass=value;
        //Also store a bunch of xxx's in the UI
        motprefs.set("ContactInfo_HP_Services/PROXY_PASSWD", "xxxxxxxxxx");
        motprefs.set("ContactInfo_HP_Services/PROXY_PASSWD2", "xxxxxxxxxx");
        motprefs.set("GlobalSettings/PROXY_PASSWD", "xxxxxxxxxx");
      }
      //Keep track of proxy server name so we can set passwd later. Also
      // store proxy server namein motprefs in 2 places
      else if (key.equalsIgnoreCase("GlobalSettings/PROXY"))
      {
    debug("  Doing special handling of GlobalSettings/PROXY");
    proxyName=value;
        motprefs.set("GlobalSettings/PROXY", value);
        motprefs.set("ContactInfo_HP_Services/PROXY", value);
      }
      // Keep track of proxy user so we can set passwd later. Also
      // store proxy user in motprefs in 2 places
      else if (key.equalsIgnoreCase("GlobalSettings/PROXY_USER"))
      {
        debug("  Doing special handling of GlobalSettings/PROXY_USER");
    proxyUser=value;
        motprefs.set("GlobalSettings/PROXY_USER", value);
        motprefs.set("ContactInfo_HP_Services/PROXY_USER", value);
      }
      // NOT a special case. Store value in motprefs
      else
      {
        //set null optional values to a""
        if ( value.equals(""))
        {
      value = " ";
        }
    motprefs.set(key, value);
  }
} // while keys.hasMoreElements
// Write motprefs
if ( ! proxyUser.equals("") )
```

-continued

```
{
        debug(" Notifying Motive of proxy authentication . . .");
    String userPasswd=proxyUser + ":" + proxyPass;
    String proxyAuthstr=new sun.misc.BASE64Encoder( ).encode(userPasswd.getBytes( ));
    motprefs.set("GlobalSettings/PROXY_AUTHSTR", proxyAuthstr);
}
else
{
        debug(" There was no proxyUser, so Motive was not notified of any proxy
    authentication");
    }
    motprefs.flush( );
    } // if setupFile.exists( )
    // Mark that we're set up now & store server name.
    debug(" Mark that the client has been setup");
    try
    {
      java.io.FileOutputStream beenSetupStream = new java.io.FileOutputStream(beenSetup);
      java.util.GregorianCalendar now = new java.util.GregorianCalendar( );
      beenSetupStream.write((new String("ConfiguredDate=" + new
Integer(now.get(java.util.Calendar.MONTH)+1) +
                    " " + now.get(java.util.Calendar.DAY_OF_MONTH) +
                    " " + now.get(java.util.Calendar.YEAR) +
                    " " + now.get(java.util.Calendar.HOUR_OF_DAY) +
                    " " + now.get(java.util.Calendar.MINUTE) +
                    " " + now.get(java.util .Calendar.SECOND) +
System.getProperty("line.separator")
                )
             ).getBytes( ));
      beenSetupStream.write((new String("Server=" + server +
System.getProperty("line.separator") )).getBytes( ));
      beenSetupStream.flush( );
    }
    catch ( java.io.FileNotFoundException e)
    {
      System.err.println("Could not open " + beenSetup.getName( ) +
          ". Configuration will be pointlessly re-run " +
          "until we can write this file. " + e.getMessage( ));
      return;
    }
    catch ( java.io.IOException e)
    {
      System.err.println("Could not write " + beenSetup.getName( ) +
          ". Configuration will be pointlessly re-run " +
          until we can write this file. " +e.getMessage( ));
      return;
    }
    // Delete setup file so we don't leave proxy password sitting around.
    debug(" Deleting the setup file");
    setupFile.delete( );
    return;
  }
}
```

The invention claimed is:

1. A method stored on a computer readable medium and executable on a computer, for setting the attributes of computers in an enterprise having multiple types of computers in order to diagnose any problems occurring in one or more of the computers, comprising:

installing attribute information on each of several different types of computers, formatting and organizing the attribute information in a way that is essentially the same on all of the different types of computers;

checking the type of each computer;

installing an incident escalator on each computer, the incident escalator being used to output an incident report due to a problem occurring on each computer;

reformatting, reorganizing, or relocating the attribute information on each computer in accordance with the requirements of each different type of computer; and outputting incident reports from each of the computers having a problem to another computer by way of the respective incident escalators, wherein, when reformatting, reorganizing, or relocating the attribute information, doing so in a way that is also in accord with the requirements of the incident escalator installed on each computer.

2. A method in accordance with claim 1 further comprising:

when reformatting, reorganizing, or relocating the attribute information, doing so in a way that is in accord with the type of operating system installed on each computer.

3. A method in accordance with claim 1 further comprising:

installing on at least some of the several different computers at least one program that requires access to the attribute information; and causing the reformatting, reorganizing, or relocating step to be carried out after this installing step and in a way that is in accord with the particular requirements of the at least one program.

4. A method in accordance with claim 1, wherein the step of installing the incident escalator on each computer comprises:
preparing a system-independent file for each of the computers, the system-independent file containing contact information, system information, proxy information, and user options;
launching the incident escalator for each of the computers;
launching, by each of the incident escalators, a callout program that configures the system-independent file in an operating-system dependent manner, in order to create a system-dependent file; and
operating the incident escalator for each of the computers using the system-dependent file.

5. A method stored on a computer readable medium and executable on a computer, for setting the attributes of computers in an environment where different computers have different systems in order to diagnose any problems occurring in one or more of the computers, the method comprising:
checking to see if the attributes have already been set before proceeding;
reading an attribute data set that is organized in a system independent manner;
using the read data set as a source of information with which to set the attributes of the computers in a manner that varies form one type of system to the next;
installing an incident escalator on each of the computers, the incident escalator being used to output an incident report due to a problem occurring on each of the computers; and
outputting incident reports from each of the computers having a problem to another computer by way of the respective incident escalators.

6. A method in accordance with claim 5, wherein the step of installing the incident escalator on each computer comprises:
preparing a system-independent file for each of the computers, the system-independent file containing contact information, system information, proxy information, and user options;
launching the incident escalator for each of the computers;
launching, by each of the incident escalators, a callout program that configures the system-independent file in an operating-system dependent manner, in order to create a system-dependent file; and
operating the incident escalator for each of the computers using the system-dependent file.

7. An apparatus stored on a computer readable medium and executable on a computer, that installs and adjusts the attributes of computers having differing types of systems in order to diagnose any problems occurring in one or more of the computers, comprising:
a first installer that installs an incident escalator on each computer, the incident escalator being used to output an incident report due to a problem occurring on each computer;
a second installer that installs a set of attributes on each computer, the attributes organized in a system independent manner;
a configuration adjuster that adjusts the set of attributes in a system dependent manner in accordance with the particular system on the computer; and
an output unit that outputs incident reports from each of the computers having a problem to another computer by way of the respective incident escalators.

8. An apparatus in accord with claim 7 wherein the system is the operating system.

9. An apparatus in accord with claim 7 wherein the system is a remote maintenance and repair system.

10. An apparatus in accordance with claim 9 wherein at least one attribute is contact information.

11. An apparatus in accordance with claim 10 wherein at least one attribute is host information.

12. An apparatus in accordance with claim 9 wherein at least one attribute is host information.

13. An apparatus in accordance with claim 7, wherein the configuration adjuster comprises:
a first launching unit for launching the incident escalator;
a second launching unit for causing the incident escalator to launch a JAVA program that reconfigures the attributes organized in a system independent manner to be organized in a system dependent manner; and
an operating unit for causing the incident escalator to operate using the attributes organized in a system dependent manner.

14. An apparatus stored on a computer readable medium and executable on a computer, that installs and then adjusts the attributes of computers having differing types of systems in order to diagnose any problems occurring in one or more of the computers, comprising:
first installer means for installing an incident escalator on each computer, the incident escalator being used to output an incident report due to a problem occurring on each computer;
second installer means for installing a set of attributes on a computer, the attributes organized in a system independent manner;
configuration adjustment means for adjusting the set of attributes in accordance with the particular system on the computer;
output means for outputting incident reports from each of the computers having a problem to another computer by way of the respective incident escalators.

15. An apparatus in accordance with claim 14, wherein the configuration adjustment means comprises:
means for launching the incident escalator;
means for causing the incident escalator to launch a JAVA program that reconfigures the attributes organized in a system independent manner to be organized in a system dependent manner; and
causing the incident escalator to operate using the attributes organized in a system dependent manner.

* * * * *